(12) United States Patent
Mohan et al.

(10) Patent No.: US 9,081,859 B2
(45) Date of Patent: Jul. 14, 2015

(54) APPARATUSES AND METHODS FOR ASSESSING USER INTEREST SCORES AS ALTERED BY FRIENDS INFLUENCE

(75) Inventors: Saravanan Mohan, Chennai (IN); Divya Sundar, Chennai (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 237 days.

(21) Appl. No.: 13/548,359

(22) Filed: Jul. 13, 2012

(65) Prior Publication Data

US 2014/0019453 A1 Jan. 16, 2014

(51) Int. Cl.
*G06F 7/00* (2006.01)
*G06F 17/30* (2006.01)

(52) U.S. Cl.
CPC ................................ *G06F 17/30867* (2013.01)

(58) Field of Classification Search
None
See application file for complete search history.

(56) References Cited

U.S. PATENT DOCUMENTS

| | | | |
|---|---|---|---|
| 8,055,664 B2 | 11/2011 | Baluja et al. | |
| 8,639,757 B1 * | 1/2014 | Zang et al. | 709/204 |
| 2008/0275861 A1 * | 11/2008 | Baluja et al. | 707/5 |
| 2008/0294607 A1 | 11/2008 | Partovi et al. | |
| 2009/0217178 A1 * | 8/2009 | Niyogi et al. | 715/753 |
| 2010/0076850 A1 | 3/2010 | Parekh et al. | |
| 2010/0228558 A1 | 9/2010 | Corcoran et al. | |
| 2010/0228614 A1 * | 9/2010 | Zhang et al. | 705/14.16 |
| 2011/0041168 A1 | 2/2011 | Murray et al. | |
| 2011/0173198 A1 * | 7/2011 | Malleshaiah et al. | 707/737 |
| 2011/0307397 A1 * | 12/2011 | Benmbarek | 705/319 |

OTHER PUBLICATIONS

Yu, Le (Bill) et al., "Adaptive Social Similarities for Recommender Systems", Proceedings of the 5th ACM Conference on Recommender Systems (RecSys '11), Oct. 23-27, 2011, ACM, pp. 257-260, New York, NY, USA.

Taghipour, Nima et al., "A Hybrid Web Recommender System Based on Q-Learning", Proceedings of the 2008 ACM Symposium on Applied Computing (SAC '08), Mar. 16-20, 2008, ACM, pp. 1164-1168, New York, NY USA.

Garcia-Molina, Hector et al., "Virtual Extension Information Seeking: Convergence of Search, Recommendations, and Advertising", Communications of the ACM, Nov. 2011, vol. 54, No. 11, pp. 121-130, New York, NY, USA.

* cited by examiner

*Primary Examiner* — Augustine K Obisesan
*Assistant Examiner* — David T Brooks
(74) *Attorney, Agent, or Firm* — Patent Portfolio Builders PLLC

(57) ABSTRACT

Methods and apparatuses for assessing user interest scores of users of a mobile network are provided. A method includes for each of a plurality of users (A) determining initial interest scores corresponding to user's interests and interest scores of friends of the user for the user's interests, based on browsing information, and (B) assessing user's interest scores based on the initial interest scores, the interest scores of the friends and friends' influence. The method further includes outputting a list including a subset of the users selected based on the user's interest scores.

18 Claims, 7 Drawing Sheets

Figure 4

```
1    Initialize domain di where i:= 1 to m(number of domains) , discount factor df(di) , reward r(di)
2    Initialize counter c where c:=1 to 5 (implies 5 days (or) the recent period) , time duration t(di) // spent in the domain
3    Initialize flag:= 1, temp , j //variables for sorting the domains based on the time duration
4    Initial reward value for all the domains r(di) := 1,tottime := 0
5    c := 1
6    if ( c < = 5 ) then   // here c:=1 implies day1, c:=2 implies day 2 ...
7        Group the web links visited by the user according to various domains
8        For i:= 1 to m do  // implies for every group of web links related to domains
9            t(di) := ? (time spent by the web links related to domain di)  // where d1 =sports,d2 =        music, d3 = news ....
10       end for
11       i := 1
12       if (i < = m ) then    // sorting domains based on time duration
13           flag :=0
14           j := 0
15           if ( j < m-1) then
16               if ( (t(dj+1 ) > t(dj)) && flag ) then
17                   temp := dj
18                   dj  := dj+1
19                   dj+1 := temp
20                   flag := 1
21               end if
22               j := j + 1
23           end if
24           i := i+ 1
25       end if
26       i := 1
27       if ( i <= m ) then
28           tottime := tottime + t(di)
29           i := i + 1
30       end if
31       for i:= 1 to m do
32           df(di) := t(di) / tottime // obtain the discount factor of all the domains
33       end for
34       for  i:= 1 to m do
35           if ( r(di+1) ! = null ) then
36               r( di ) = r(di) + ( df(di) * r(di+1))
37           else
38               r( di ) = r(di) + ( df(di) * 1)
39           end if
40       end for
41       c := c +1
42   end if
```

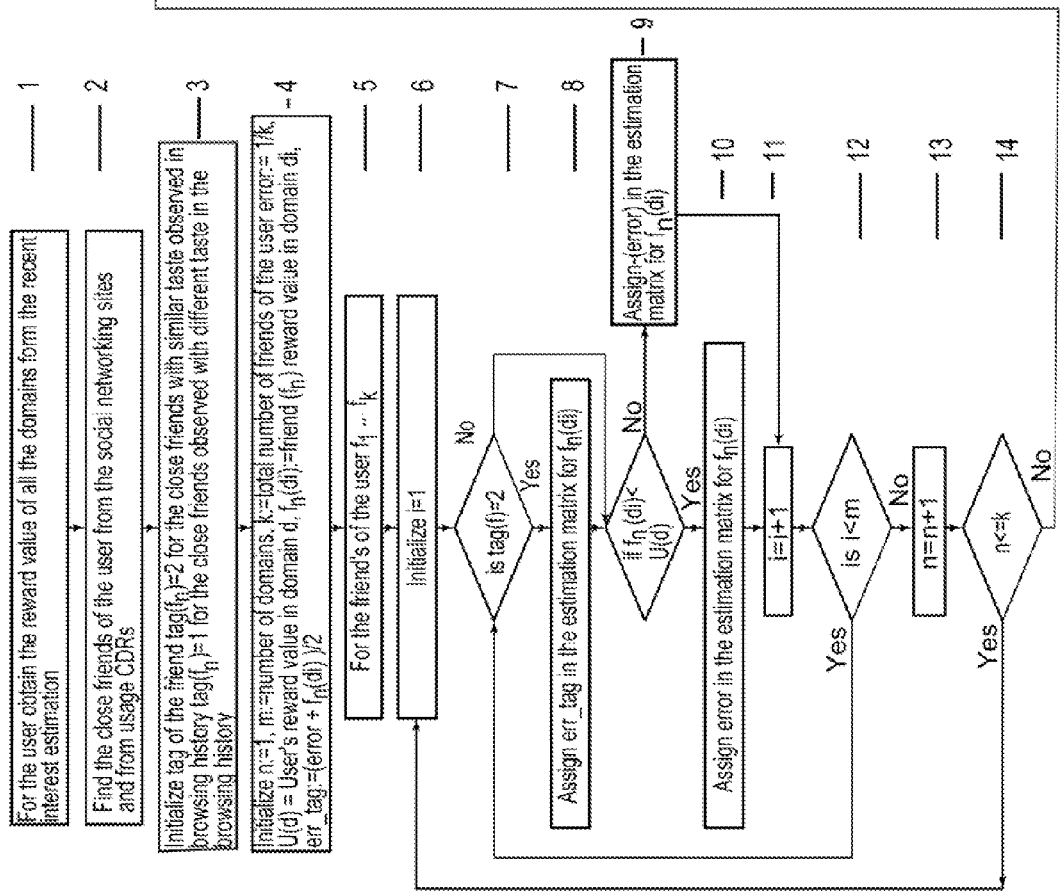

ns and
methods for assessing interest scores of users as altered by
their friends' influence, more particularly, calculating initial
interest scores for each user of a browsing application and a
social networking application and then assessing user interest
scores based on the initial interest scores, interest scores of
the friends, and friends' influence.

BACKGROUND

In the context of exploding diversity and use of mobile
devices, a fundamental research challenge is delivering efficiently and effectively the right information, to the right
people, at the right time. Advertising is more productive when
the recommendations are selectively channeled, taking into
consideration the individual customer's real interests. Conventional systems select customers for product marketing
(e.g., targeted advertisements) based on demographics and/or
observed behavior from Web-based applications such as
social networking sites (e.g., Facebook, twitter, etc.). The
influence of friends on customer decisions has been considered, with social influence playing an important role in product marketing.

Analyzing social network data to learn about users' interests and transferring documents to users based on their profiles sketched using a database of keywords for the item
recommendation have been considered. Recently, some studies consider the likes and dislikes of an individual and his or
her friends' interests and works out a separate ranking module
to understand the closeness of friends. Recommendation (i.e.,
selecting or organizing information for individual users) has
been an active application area for information filtering, Web
mining and machine learning research. Recent studies show
that combining conceptual and usage information can
improve the quality of Web recommendations.

Reinforcement learning is a new technique devised for
higher quality Web recommendations based on Web usage
data. Recent studies show that combining conceptual and
usage information can improve the quality of Web recommendations. Reinforcement learning is a new technique
devised for higher quality Web recommendations based on
Web usage data.

Thus, the explosion of information is associated with an
explosion of information about the users of various network
applications that has the potential of being used to devise
more effective recommendation methods that would better
serve both product or information providers and the public.

SUMMARY

Embodiments described and claimed herewith use information about the users of various network applications to
identify their interests and to assess interest scores. More
specifically, user interests and corresponding initial scores
may be determined based on percentages of time spent
recently browsing documents related to each interest, and the
interest scores are assessed by altering the initial scores to
take into consideration corresponding interest scores of
friends and friends' influence. Friends may be identified, for
example, using call data records and/or information gathered
via social network applications.

According to one exemplary embodiment, there is a
method for assessing user interest scores of users of a mobile
network. The method includes for each of a plurality of users
(A) determining initial interest scores corresponding to user's
interests and interest scores of friends of the user for the user's
interests, based on browsing information, and (B) assessing a
user's interest scores based on the initial interest scores, the
interest scores of the friends, and friends' influence. The
method further includes outputting a list including a subset of
the users selected based on the user's interest scores.

According to another exemplary embodiment, there is an
apparatus for assessing user interest scores as altered by
friends' influence, including an interface and a data processing unit. The interface is configured to receive information
related to a plurality of users. The data processing unit is
configured (A) to determine initial interest scores corresponding to user's interests and interest scores of friends of
the user for the user's interests based on browsing information, (B) to assess user's interest scores based on the initial
interest scores, the interest scores of the friends and friends'
influence, and (C) to output a list including a subset of the
users selected based on the user's interest scores.

According to another exemplary embodiment, there is a
computer-readable medium non-transitory storing executable codes which, when executed on a computer, make the
computer perform a method for assessing interest scores of
users of a mobile network. The method includes for each of a
plurality of users (A) determining initial interest scores corresponding to each user's interests and interest scores of
friends of the user for the user's interests, based on browsing
information, and (B) assessing user's interest scores based on
the initial interest scores, the interest scores of friends, and
friends' influence. The method further includes outputting a
list including a subset of the users selected based on the user's
interest scores.

BRIEF DESCRIPTION OF THE DRAWINGS

The accompanying drawings, which are incorporated in
and constitute a part of the specification, illustrate one or
more embodiments and, together with the description,
explain these embodiments. In the drawings:

FIG. 4 is a sequence of code exemplarily illustrating an
implementation of recent interest score estimation, according
to an embodiment;

FIG. 5 represents a flow diagram illustrating an exemplary
embodiment of applying a reward mechanism to estimate the
friends' influence on the user;

DETAILED DESCRIPTION

Figure 1:
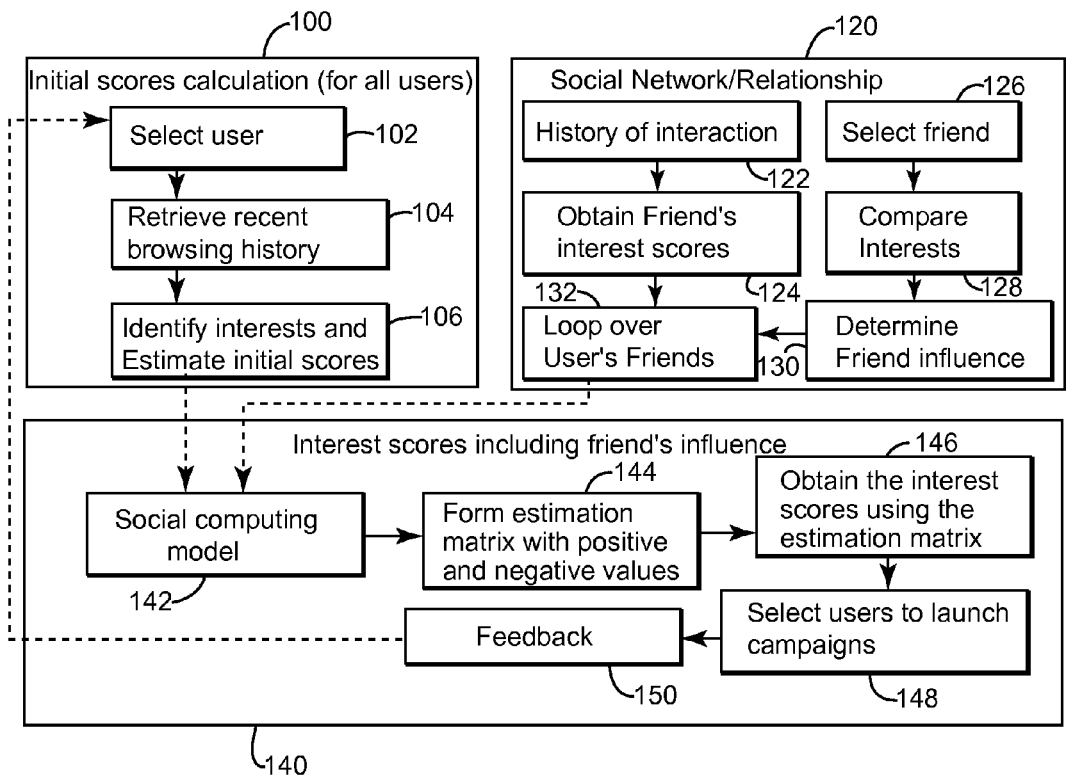
FIG. 1 illustrates a framework according to an exemplary
embodiment.

The following description of the exemplary embodiments
refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a network communication system. However, the embodiments to be discussed next are not limited to these systems, but may be applied to other existing systems in which a user has access to various pieces of information via a browser-type application and interacts with other users via a social network type of application.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

In the context of widespread network-connected mobile devices, mobile network service providers find themselves in a privileged position, allowing them to provide recommendations for marketing and advertising to mobile phone users based on analyzing information related to the users' browsing and social behavior via the network. Some of the following embodiments implement new methods quantifying the impact of interests manifested by social network friends on users' acceptance toward advertisements related to particular fields of interest.

In assessing users' acceptance, some embodiments take into consideration both positive influences (that reinforce user's interest) and negative influences (that lower the likelihood of acceptance from a level estimated based solely on the user's behavior).

It is desirable that assessing interest scores of users as altered by their friends' influence to include a feedback reward mechanism based on a degree to which the user's interests coincide with his or her friends' interests. Interest scores of users which reflect not only users' initial scores, but are altered based on friends' influence, enable the network operator to selectively deliver customer-specific advertisement. For example, a customer may be interested in having its product advertisements delivered to users having a high interest score (e.g., above a predetermined threshold, or a predetermined number of users having the highest score). In another example, a customer may be interested in having an enticing advertisement delivered to users having low scores resulting mainly from friends' influence. Using a feedback mechanism (e.g., in the form of rewards) enhances the user selection process by shuffling the ranking (i.e., scores) to embed not only a user's own interest but also friends' influence. It is advantageous to provide customers with flexibility and options in selecting users for targeted advertisement. On the other hand, it is advantageous for users to receive both recommendations better matched with their interests and toward new potential interests that are inspired by their friends' interests.

Browsing applications provide information that enable identifying and quantifying users' interests based on parameters such as a volume of data pertaining to a specific field downloaded/uploaded, amount spent and/or time spent by the users to search and gain access to data pertaining to the specific field, etc.

Social networking applications provide information that may be processed to characterize a user's social behavior. Friend networks are formed via social networking applications based on one-to-one interactions or joining groups.

Some of the following embodiments combine the information gathered for users of a (i.e., at least one) browsing application and a (i.e., at least one) social networking application. For example, from a user's recent logs reflecting their browsing pattern, the user's interests may be identified and associated with initial interest scores. Then, using a reinforcement learning type of approach related to friends of the user as reflected by the user's use of the social networking application, interest scores are asserted based on the initial interest scores, interest scores of the friends, and friends' influence.

The framework according to some exemplary embodiments is illustrated in FIG. 1. The friends' influence may reinforce the user's interests (increase an interest score), the user's interest scores being altered depending on friends' scores. Only a subset of friends may be considered, the subset being selected based on the history of interaction as shown in FIG. 1. Some embodiments calculate user interest scores based on social networking behavior through the use of a reinforcement model. FIG. 1 also illustrates the social network friends' impact on the user scores through a reward mechanism. Mobile network operators have access to information (browsing history and social network interaction history) that enables them to apply reinforcement techniques to efficiently take into consideration the friends' influence on user choices in social computing. The interests of a user may be identified through the application of a Q-learning model and with reward calculation. The estimation matrices are formed in this process based on a comparison of friends' activity (the concept of friend being defined in social network context) and interests. The interest scores then better indicate users' acceptance toward marketing and advertisement recommendations for specific topics (i.e., domains and sub-domains that may be a user's interest).

As illustrated in FIG. 1, an initial score calculation is performed in module 100 for all users, one by one. Thus, focusing on a user selected at 102, the selected user's recent browsing history is retrieved at 104. The user's recent browsing history is the information based on which the user's interests are identified and ranked via initial interest scores, at 106.

The social network/relationship evaluation is performed in module 120. Here, based on the history of interaction of the user retrieved at 122, friends are identified and their interest scores are obtained at 124. For each of the friends as selected one by one at 126, the friend's influence is determined at 130. The outputs of blocks 130 and 124 are then combined at 132 to be supplied to module 140.

Module 140 is configured to assess user interest scores including the friends' influence. A social computing model organizes at 142 the user's initial interest scores and the friend-related information received from module 132 enabling to form an estimation matrix with positive and negative values at 144. This estimation matrix is used to obtain the interest scores that include the friends' influence, at 146. Based on all user scores associated with fields and domains of interest, subsets of users may be selected to launch marketing campaigns at 148. The acceptance of information provided to an individual user via these campaigns is fed back at 150 to the initial scores calculation, i.e., module 100.

In order to provide good recommendations, the user browsing pattern is retrieved and interpreted to identify and rank the user's interests. This approach allows frequently suggesting domains/sub-domains that best satisfy the user, which enables a self-interested module to maximize its revenue. In order to flexibly adjust to a user's current preferences, an accessed recommendation returns profits (by receiving rewards) and an ignored recommendation loses credits (while not receiving rewards). This type of trial-and-error learning behavior is similar to reinforcement learning techniques. However, in the context of a Q-learning model used in reinforcement learning, taking one action is independent of taking another (because future rewards are only based on future recommendations and have no relationship to the current recommendation). In other words, in the framework illustrated in FIG. 1, the learning strategy does not use the concept of states and state transition, considering the actions and their corresponding rewards only.

The process framework illustrated in FIG. 1 enables finding the recent interest scores of users for selecting users for marketing campaigns. Both recent user activities and friends' influence are analyzed based on the premise that the friends' influence alters the interests of the user. The friends' influence is weighted differently for friends considered close to the user (e.g., which have similar interest patterns to the user's, inferred from their recent browsing history) than for other friends (e.g., the ones who do not have interest patterns similar to the user's). The interest scores of friends for a domain alter the initial user's score for that domain in a manner depending on each friend's influence. This interest score of the user including the friends' influence provides a more effective basis for selecting users for targeted advertisement as demanded by customers.

The most popular social networking applications are Facebook and Twitter, but other social networking applications may be used to gather information on friends of users. The browsing information may be gathered from Call Data Records (CDRs) to identify user's interests and generate initial interest scores. After identifying initial interest scores of the user and his or her friends based on the browsing information, Q-learning-type methods may be employed to determine reward values, altering the initial scores depending on friends' influence. The reward values depend on actions. The reward alters the initial interest score in a manner determined by a user's action. For example, an action may refer to the Web links related to a specific interest that the user has visited.

The interests may be hierarchically organized in domains such as sports, music, etc., and sub-domains such as country-western music being a sub-domain of music. Based on the Web links the user has seen, a discount factor may be calculated. The discount factor may depend on the time spent by the user displaying or searching Web links related to a particular interest (e.g., sub-domain). An initial reward value may be chosen based on the time duration spent in the links, and the new reward value may be calculated for every domain. The reward values alter the initial scores of the user to yield interest scores that take into consideration friends' influence.

Two issues arise in gauging the friends influence: identifying the friends and assessing their closeness. The friends of the user may be mobile network users and may be identified based on call data records (e.g., friends of the user may be found from the call graphs that are generated based on these records). Alternatively or additionally, friends of the user may be identified based on information gathered via one or more social networking applications (e.g., friends may be found from the social networking sites such as the twitter, Facebook, blogs, etc.). The above described techniques for identifying friends are exemplary and not intended to be limiting.

The closeness/influence of the friends may be represented as a tag value. This tag value corresponding to a friend may be determined by comparing the browsing history and/or the interests of the user and of the friend. For example, a friend may be assigned a first tag (e.g., 2) if he has the similar browsing pattern as that of the user (accepting more recommendations from an operator together), while another friend may be assigned a second tag value (e.g., 1) if he does not have a similar browsing pattern as the user. In another example, the tag value may be assigned based on a comparison of the user's interests and the friend's interest over a long term. The friend who has the first tag value has a higher chance to reinforce (i.e., increase) the initial score than the friend who has the second tag value. This tag value may be flexibly chosen by the network operator depending upon a target of user selection based on interest scores. An estimation matrix is formed using the user's initial scores and his friends' initial scores. The matrix elements are determined by comparing the user's domain reward value and friends' domain reward value. This value reinforces the user's reward value in the domain, which is used to make a decision on the user's selection for the campaign. The validity of this approach may be verified by observing the user's interest patterns over a period of time based on information from the social networking sites and also from the CDRs.

From an analytics product perspective, Mobile Broadband Analysis is a term covering methods of characterizing and predicting a user's behavior based on his or her network usage and spending details extracted from Call Detail Records (CDRs). In addition to the CDRs, information provided by Service Aware Support Nodes (SASN) may be combined and used to select users for marketing campaigns to optimize the likelihood that selected users will be interested in the targeted products.

Some embodiments may be software and may be deployed to run on already-existing hardware of the mobile network operator. Other embodiments may be a combination of software and hardware or a dedicated hardware interface with the mobile network operator. Information on usage and spending data obtained, for example, from the CDRs may be used in combination with General Packet Radio Service (GPRS) data that is obtained from the SASN node. Information indicative of a user's interests is retrieved from logs, and then interpreted taking into consideration the influence of the user's friends.

Figure 2:
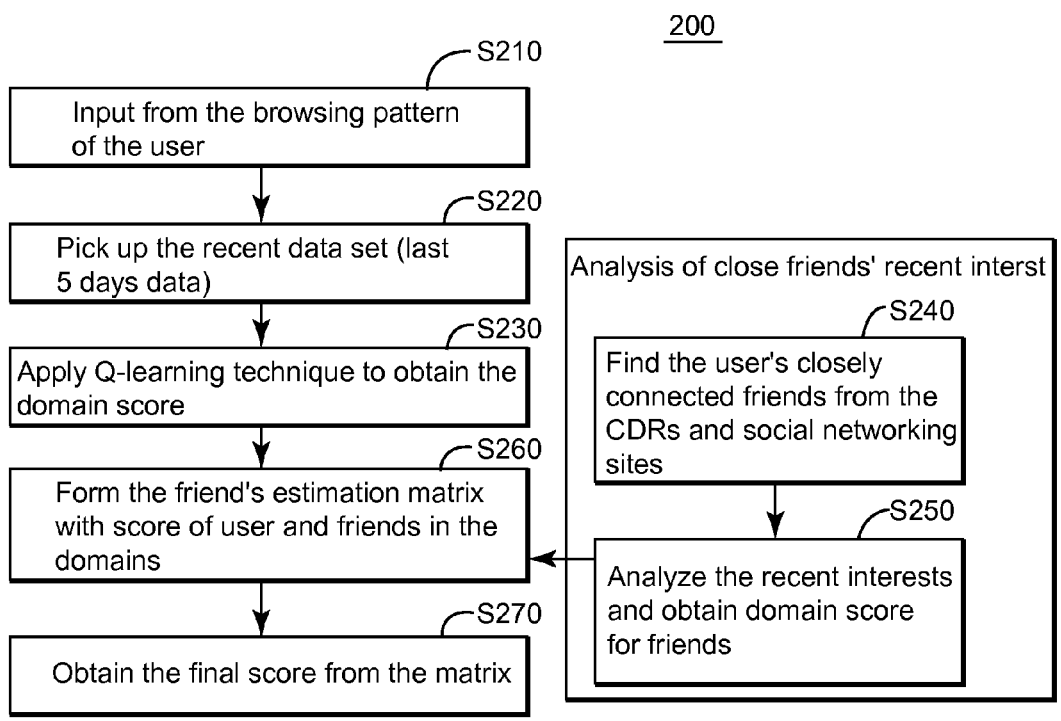
FIG. 2 is a flow diagram of a method for estimating influence of friends on the user as related to one domain according
to an exemplary embodiment.

FIG. 2 is a flow diagram of a method 200 for estimating the influence of friends on a user as related to one domain according to an exemplary embodiment. First, at S210, information on the user's browsing pattern is retrieved (input). From this information, a recent subset (e.g., the most recent five days) is retained at S220 to apply a Q-learning technique to obtain the initial domain score at S230. Meanwhile (or successively with S210-S230) the close friends' recent interests are analyzed, by finding the user's closely connected friends using CDRs and social networking sites at S240, and analyzing the recent interests and obtaining a domain score for these friends at S250.

Further, at S260, the output of S230 and S250 are combined to form the friends' estimation matrix with the scores of user and friends for the domain. At S270, a final score is obtained from the matrix.

In order to estimate the influence of the friends on the user, the Web links the user has already seen may be analyzed and classified based on their relevance to the domains considered. The time spent browsing or searching for Web links related to each of the domains is also analyzed and a Q-learning method may be used to find the appropriate value (i.e., initial score) when the next state is traversed. The system selects a state (i.e., domain) to start initially and then traverses across the states (i.e., considers other domains) based on the action of the user. When a new state is encountered, a new reward value is found for that state. When a system completes finding the reward values (i.e., initial scores) of the states, the next step is forming of the friends' estimation matrix.

In order to provide to a user recommendations, the domains of interest of the user are analyzed and ranked. Various domains like sports, music, news, etc. may be considered. Sub-domains of each of the user's domains of interest may further be considered. The domains may be general areas in which the network operators can launch campaigns. The sub-domains are various specific divisions of the general domain. For example, if sport is considered as the general domain, then specific sub-domains may be cricket, tennis, soccer, etc. For example, five domains and five sub-domain categories under each domain may be considered. Analyzing the user's interest may be structured in two steps: a pre-processing step and an actual processing step.

Focusing now on pre-processing, the CDR may provide information such as calling numbers, called numbers, location, time of each call and duration of each call. A Mobile Switching Center (MSC) is a functional module of the network operator (e.g., a GPRS network) that operates as a telephone exchange making the connection between mobile users within the network, from mobile users to the public switched telephone network, and from mobile users to other mobile networks. The MSC also administers handovers to neighboring base stations, keeps a record of the location of mobile subscribers, and is responsible for subscriber services and billing. The Serving GPRS Support Node (SGSN) is a component of a GPRS network, which handles all packet-switched data within the network, e.g., the mobility management and authentication of the users. The SGSN performs the same functions as the MSC for voice traffic. A Gateway GPRS Support Node (GGSN) or Service Aware Support Node (SASN) is another component of the GPRS network responsible for interconnecting the GPRS network and external packet-switched networks, like the Internet and X.25 networks. Based on information extracted from the CDRs, the network operator may infer the usage behavior of a network subscriber (user) and send advertisement to those users most likely to respond.

After the data collection, a look-up table may be generated for the domains and the sub-domains. For example, five domains such as computer, news, sports, music and recreation may be considered, each domain having five sub-domains that are analyzed for predicting the user's interests. The look-up tables are formed based on processing the Web documents available for each sub-domain (category). These documents are analyzed for the nature of the context and important keywords under each category. The domain-specific keywords are stored in the look-up tables. This database of words is maintained for the analysis of the user's interests.

Focusing now on the actual processing, an interest measure is calculated using a Q-learning technique for calculating initial scores of the domains based on the time spent by the user to search or study websites/documents pertaining to each domain. A reward score of the domain is obtained from an initial reward value and a discount factor. The discount factor for a specific domain is obtained based on a ratio of the time spent on the specific domain and the time spent on other domains. This technique can be visualized as the states representing the different domains and the actions that connect these states. The agent is the external system that tries to analyze the user's interests. The reward values are used again in calculating the final domain score, which is compared with the friends' domain score in forming the estimation matrix.

Q-learning is a reinforcement learning technique that works by learning an action-value function that gives the expected utility of taking a given action in a given state and following a fixed policy thereafter. Q-learning may be expressed by the following formula $$Q(s_t, a_t) \leftarrow Q(s_t, a_t)(1 - a_t(s_t, a_t)) + a_t(s_t, a_t)\left[R(s_t) + \gamma \max_{at+1} Q(s_{t+1}, a_{t+1})\right]$$

The episode (e.g., playing of a game) of this method ends when $s_{t+1}$ is the final state. Here $R(s_t)$ is the reward observed from the state $s_t$ and the $\gamma$ is the discount factor. Here, the reward and the discount factor are used to obtain the new value of the reward for every domain. The formula above may be modified to obtain the reward value for every state (domain) and this value used for finding the friends' influence on the user's interest. A formula to obtain the reward value of a domain may be $$r(d_i) = r(d_i) + (df(d_i) * r(d_{i+1}))$$

where the reward value $r(d_i)$ is updated based on the discount factor $df(d_i)$ and the previous reward value of the domains.

In order to assign an error factor that reinforces the user's domain value based on the friend's interest in the domains, a tag value is associated to the user's friend. If the tag value is 2 (e.g., the friend and the user have similar interest patterns) a new error value is found out and entered in the estimation matrix. If the tag value of a user's friend is 1, then the friend's domain reward value (i.e., initial score) is compared with the user's domain reward value. If the friend's domain reward value is smaller than the user's domain reward value, a negative error factor is entered in the estimation matrix, and if the friend's domain reward value is larger than the user's domain value, the error factor as a positive value is entered in the estimation matrix. This error factor is small and configurable. The final domain reward value (i.e., interest score including a friend's influence) of the user is obtained by adding the entries of the friend's domain value from the estimation matrix. The final value after the friend's influence helps in the selection of the user for the respective domain-specific campaigns based on the highest preference of the interest.

The steps leading to the recent interest estimation for the domains while applying Q-learning technique are explained briefly below.

1. Recent interest scores are extracted before taking into consideration the friend's influence.
2. Interests are identified and the recent interest score may be obtained by analyzing the browsing patterns of the user during the most recent period of a predetermined duration (e.g., five days). This predetermined duration may be extended, e.g., up to one month if necessary. Analyzing the browsing pattern may be performed by a stream analytic tool, such as complex event process (CEP), using Ericsson's Multi Service Proxy (MSP), etc., or Smart RAN Project.
3. A predetermined number of domains and sub-domains may be considered. For example, five domains of interest (sports, music, etc.) and five sub domains (e.g., cricket, football, etc.) under every domain may be considered.
4. The process of reward estimation in the recent period (in this case five days) loops over interests and time. For example, for each day in the five-day period, the Web links visited by the user are grouped together related to the domains. For this purpose, the look-up tables generated during the pre-processing may be used. These look-up tables provide a database of the words related to every domain. After parsing the Web links and comparing them with the database of words, they are tagged with the domain name to which they closely relate and are grouped together.

Figure 3:
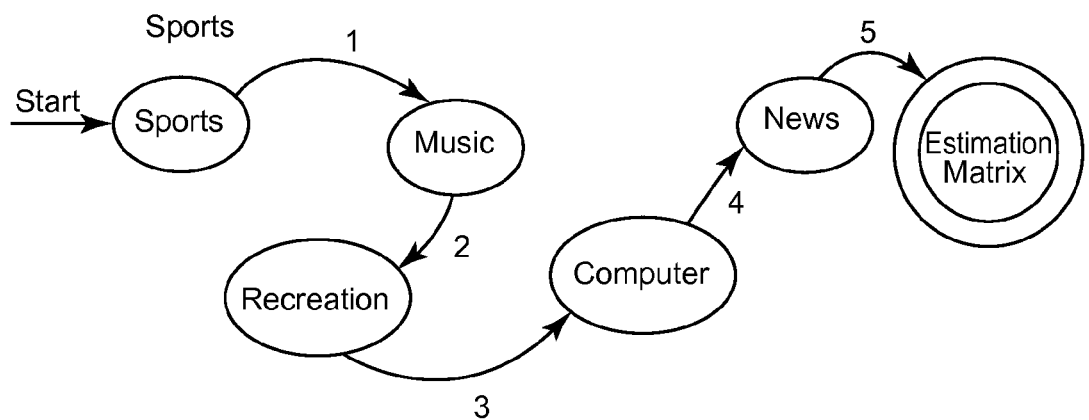
FIG. 3 is a state action transition diagram for interest estimation according to an exemplary embodiment.

5. After grouping of the Web links, times spent in each domain and the total time spent are calculated.
6. The domains may be ranked (ordered) based on the corresponding time spent in each domain. Such an order may be useful to identify the domains for which the user has higher reward values (i.e., initial scores) since he or she spent larger amounts of time by searching and analyzing Web links pertinent to the respective domains. In this case, the state is the domain with the highest contribution to the time duration and the action is visiting the next subsequent domain in order. FIG. 3 exemplarily illustrates a state action transition diagram for interest estimation when the domain with the highest contribution to the time duration is sports, the next is music, then recreation, then computer and finally news. In this case, the agent starts traversing the domain sports (the domain with highest time duration), music, recreation, computer, news, and finally the reward scores are used to form the friends' influence estimation matrix.
7. After ranking the domains, the discount factor for every domain may be calculated as a two-step process. In the first step, the total time, which is the sum of all the time durations spent in all the domains, is calculated. In the second step, the discount factor for a domain may be calculated as a ratio of the times spent in the domain and the calculated total time.
8. An initial reward value for each of the domains may be 1 (i.e., the optimistic value), and this value is updated each time a new reward value corresponding to another day is calculated. The reward value is calculated based on the initial reward value, the discount factor of the domain, and the reward value for the next subsequent domain. Since the domains have been ordered based on the time duration, the reward value of the first domain in the order is affected by the reward value of the next domain in the order, and so on. For the last domain in the order, since there is no next domain, a smaller reward value is obtained because 1 is used instead of a larger than 1 reward value of the next domain and also because the discount factor is smallest among the domains.
9. After the information for each of the five days is considered, initial scores corresponding to the user's interest are output to be used as input to the next phase in which the friends' influence is taken into consideration.

FIG. 4 is a sequence of code exemplarily illustrating an implementation of recent interest score estimation, according to an embodiment.

Further, a flow diagram illustrating an exemplary embodiment of applying a reward mechanism to estimate the friends' influence on the user is illustrated in FIG. 5. The reward values of the user and the user's friends in every domain are used in forming the estimation matrix. For every domain, the user's reward value is compared with friends' reward value in that corresponding domain. An error factor that reinforces the user's domain value may be based on the friends' interest in the domains as previously explained. All the friends and all the domains are considered.

The final domain value (i.e., interest scores including the friends' influence) obtained based on the friends' value in the domain. These final values for the domains may be sorted in order to find the user's the highest interest. The selection of the user for the campaign is then based on these final values. A user's interests may be monitored over a period of time by analyzing the social network data of the user.

Steps 1, 2, 3 in the flow chart represent associating tag values to the friends of the user based on the similarity of their browsing patterns with that of the user. Step 4 represents an initialization of the error factor value and the err_tag values that are used in the calculation. In this embodiment, the error factor=1/k (where k=number of friends of the user) and err_tag=(error factor+$f_n(d_i)$)/2 where $f_n(d_i)$ is the reward value of the friend($f_n$) in the domain $d_i$. Steps 5 to 12 correspond to a loop which enters values in elements of the estimation matrix. These values are based on the tag values of the friends and their domain scores. The negative value is entered in the estimation matrix when the friends' score in the domain is smaller than the user's score. In steps 17 to 19, the respective values from the estimation matrix are added for the various domains considered. In steps 20 to 22, the values from the estimation matrix under every domain are added to the domain score of the user. The resulting final domain score includes influence from the friends of the user, which enables in the selection of the user for the final recommendation.

Figure 6:
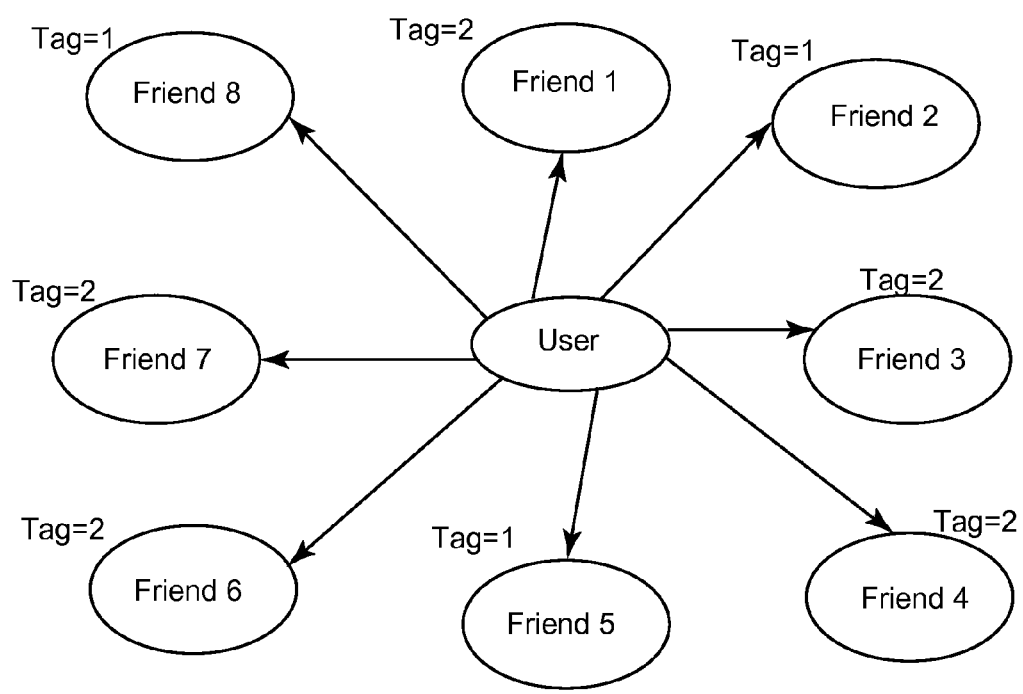
FIG. 6 illustrates a collection of friends of a user and their
respective tags according to an exemplary embodiment.

The estimation matrix is formed after analyzing the close friends of the user from the social networking sites and from CDRs. For example, FIG. 6 illustrates a collection of friends of a user and their respective tags. The tag values may be obtained by comparing the browsing history patterns of the user and of his or her friends. A user's friends having an associated tag value of 2 have more impact on the user than the user's friends having an associated tag value of 1. The error factor also depends on the tag values of the user's friends. This approach allows considering both the influence of close friends and of the friends with close taste.

A numeric calculation according to one embodiment is set forth below. The following numeric example is for illustration purposes and is not intended to limit the various embodiments. In this example, three domains ($d_1$, $d_2$ and $d_3$) and three friends (friend 1, friend 2 and friend 3) are considered for forming an estimation matrix illustrating the friends' influence. The user's reward value (initial scores) for the domains $d_1$, $d_2$ and $d_3$ are: $U(d_1)$=0.8, $U(d_2)$=0.566, and $U(d_3)$=0.4.

Friend 1's scores for the domains $d_1$ $d_2$ and $d_3$ are $f_1(d_{11})$=0.7, $f_1(d_{12})$=0.451, $f_1(d_{13})$=0.44, and friend 1's tag value is tag($f_1$)=2. Friend 2's scores are $f_2(d_{21})$=0.3, $f_2(d_{22})$=0.22, $f_2(d_{23})$=0.11, and friend 2's tag value is tag($f_2$)=1. Friend 3's scores are $f_3(d_{31})$=0.66, $f_3(d_{32})$=0.542, $f_3(d_{33})$=0.123, and friend 3's tag value is tag($f_3$)=2. Since the number of the user's friends is 3, the error factor is ⅓=0.333.

If the tag value of a friend is 2, the friend's influence value entered into the estimation matrix is the average of the friend's reward value for the domain and the error factor. If the tag value of a friend is 1, in order to estimate the friend's influence value to enter into the estimation matrix, the friend's reward value for the domain is compared with the user's reward value for the domain. If the friend's reward value for the domain is smaller than the user's reward value for the domain, then the friend's influence value is negative of the error value. If the friend's reward value for the domain is larger than the user's reward value for the domain, then the friend's influence value is positive of the error value.

Since the tag value associated with friend 1 is 2 (e.g., the history of browsing patterns of the user and of the friend are the same; hence, the user likely responds to advertisement similar to the friend's response), there is no comparison of the user's domain score and the friend's domain score. Friend 1's influence value for the estimation matrix is $f_1(d_1)$=(0.7+0.333)/2 (the average of friend 1's domain interest value and error value=0.5167). In the same manner, friend 1's domain $d_2$ and $d_3$ influence values and friend 3's domain influence values are determined.

Since friend 2's tag value is 1, a comparison of friend 2's domain interest value and the user's interest value is performed for each domain. Since $f_2(d_{21})<U(d_1)$, $f_2(d_1)=-0.333$, and similar $f_2(d_{22})<U(d_2)$, $f_2(d_2)=-0.333$, and $f_2(d_{23})<U(d_3)$, $f_2(d_3)=-0.333$. If friend 2's interest value in a particular domain were larger than the user's interest value in the same domain, the positive value of error factor would have been entered in the estimation matrix. Table 1 below illustrates the estimation matrix obtained in the above calculation.

| Domains | Friend 1(f1) | | | Friend 2(f2) | | | Friend 3(f3) | | |
|---|---|---|---|---|---|---|---|---|---|
| | $d_1$ | $d_2$ | $d_3$ | $d_1$ | $d_2$ | $d_3$ | $d_1$ | $d_2$ | $d_3$ |
| $d_1$ | 0.5167 | — | — | −.33 | — | — | 0.3865 | — | — |
| $d_2$ | — | 0.3150 | — | — | −.33 | — | — | 0.436 | — |
| $d_3$ | — | — | 0.3865 | — | — | −.33 | — | — | 0.2265 |

Since the number of friends of the user considered here is 3 (k=3) the error factor is small, about 0.33. The friends' domain value is compared with the user's domain value, and the corresponding entries for the error factor are added in the estimation matrix. The negative effect reflects disinterest in the domain. If none of the friends are interested in the domain, then the user's reward value (initial interest score) corresponding to that domain is lowered due to the negative effect of the error factor. The sum of the friends' influence value is added to the user's domain reward.

The negative value is entered in the matrix based on the tag value associated with the friends of the user. If the tag value is 2 (e.g., the friends had a similar browsing history as that of the user, and the user is likely to respond the same way as the friends), the influence is positive, increasing the user's initial score. The friend influence may be negative only when the tag value is 1 (e.g., friends with a browsing history pattern that is not similar to the user's browsing history pattern). The negative values lower the final domain score of the user. In the above numerical example, friend 2 has a negative influence because his tag value is 1, and all his domain values are lower than the user's domain value for the same domain, while friends 1 and 3 have positive influences.

The final value of the domain $d_1$ for the user is $U'(d_1)=U(d_1)+f_1(d_1)+f_2(d_1)+f_3(d_1)=0.8+0.5167+(-0.33)+0.3865$. The final value of the domain $d_2$ for the user is $U'(d_2)=U(d_2)+f_1(d_2)+f_2(d_2)+f_3(d_2)=0.7+0.3150+(-0.33)+0.436=0.9870$. The final value of the domain $d_3$ for the user is $U'(d_3)=U(d_3)+f_1(d_3)+f_2(d_3)+f_3(d_3)=0.4+0.3865+(-0.33)+0.2265=0.6830$.

In this case, the final values for the user have the same order as the user's reward value (initial scores).

Using social computing framework and users' interest scores, including friends' influence enables selecting a specific set of users when any new marketing campaign is launched. This approach takes into consideration friends' influence on users, leading to achieving a higher response percentage, thereby increasing the customers' satisfaction on the operators' initiatives. Hence, some embodiments provide the mobile network operators versatile tools to choose users for targeted advertisement. In other words, information processing leading to user interest scores that include friends' influence allows better selecting users for domain-specific advertisement. A network operator using embodiments described above is enabled to launch new customized advertisement based on the information extracted from the domain-specific group. Friends' influence on users may be recorded and its evolution tracked. Using methods according to various embodiments increases the percentage of users responding when receiving an advertisement related to their highest interest score. Usage of such methods also helps to improve the business profit of the mobile network operators when advertisements are sent only to the users more likely to respond. The user scores including the friends' influence enable the network operator to better quantify the users' interests using information gathered from social networking sites. The methods may be extended to any number of social networking sites a user accesses through his or her mobile phone. The methods are also helpful in improving the loyalty of users by reducing the volume of unsolicited information, with users receiving more relevant advertisements.

Figure 7:
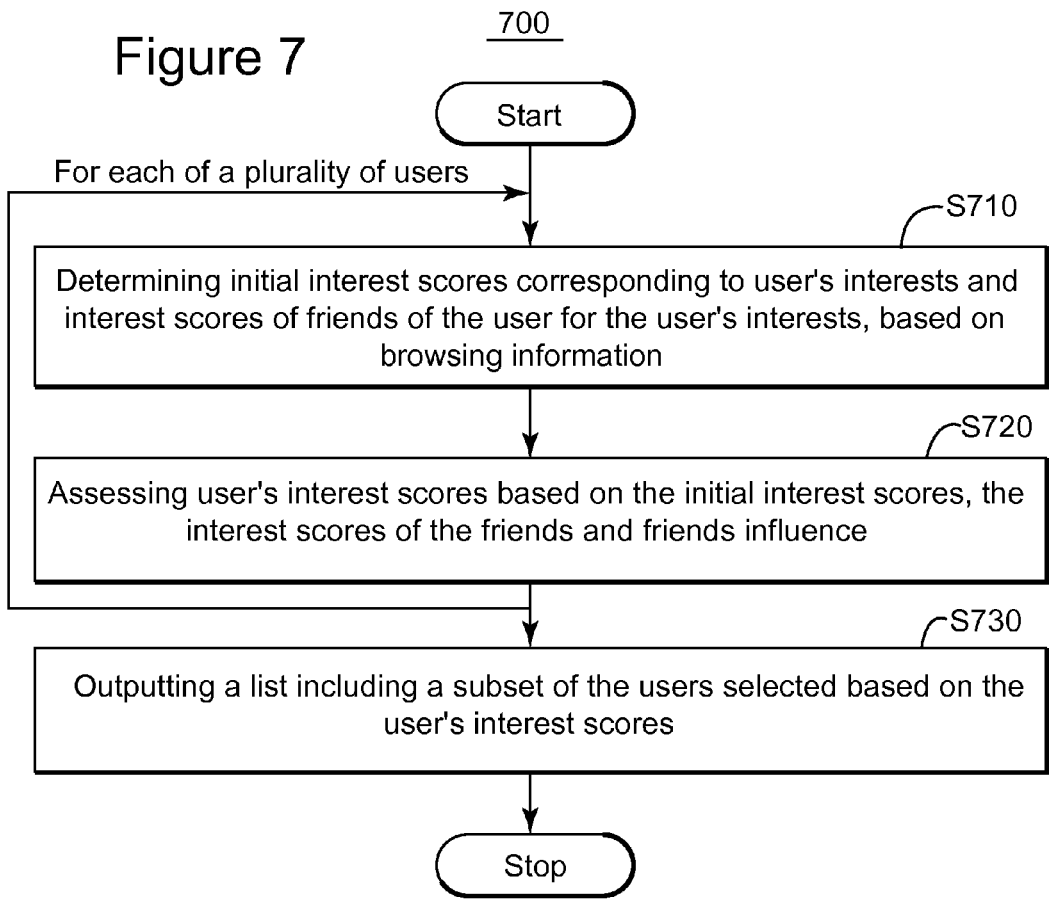
FIG. 7 is a flow diagram of a method for assessing interest
scores of users of a browsing application and a social networking application according to an exemplary embodiment.

A flow diagram of a method 700 for assessing user interest scores of users of a mobile is illustrated in FIG. 7. Method 700 includes for each of a plurality of users (A) determining initial interest scores corresponding to a user's interests and interest scores of friends of the user for the user's interests, based on browsing information, at S710, and (B) assessing a user's interest scores based on the initial interest scores, the interest scores of the friends, and friends' influence at S720. Method 700 then includes outputting a list including a subset of users selected based on the users' interest scores, at S730.

The browsing information may be gathered via a browsing application but the term "browsing" is not intended to be limited to Internet browsing, but other applications accessing data may be used. The friends of the user may be mobile network users and may be identified based on call data records (CDRs). For example, friends of the user may be found from the call graphs that are generated through the CDRs. A call graph connects the persons from the list of the calls and the messages made to each other (this indirectly indicates the closeness of the user and his friends). Alternatively or additionally, friends of the user may be identified based on information gathered via a social networking application. Friends may be found from the social networking sites such as the twitter, facebook, blogs, etc. through the comments and the posts, lists of photo shared, through the tweets and the friend followers etc. Yet the friends of the users may be identified based on frequency and time of viewing the same website or being member of the same interest group (e.g., browsing the same photo collection, etc.).

The user's interests may be determined based on the user's browsing history over a predetermined recent period of time (e.g., five days or a month). In determining user interests, look-up tables including words relevant for domains and or sub-domains may be used. The user's interests may be structured as domains up to a first predetermined number of domains, and as sub-domains up to a second predetermined number of sub-domains for each domain.

In some embodiments, each of the initial interest scores corresponding to one of the user's interests may be calculated using a ratio of the time spent browsing content related to the corresponding one of the user's interests and a total browsing time. The interest scores of the friends are determined in the same manner as the initial interest scores of the user.

A friend's influence is positive if a user's recent browsing pattern is similar to the friend's recent browsing pattern. If the user's recent browsing pattern is not similar to the friend's recent browsing pattern, a friend's influence for a specific interest may be negative if the user's initial score for the specific interest is larger than friend's initial score for the specific interest, but may be positive otherwise.

Assessing the user's interest scores may include (A) calculating an error factor that is equal to 1 over a number of the friends taken into consideration, (B) for each interest and each friend, calculating a friend's contribution to a user's interest score for the interest according to predetermined rules. These rules may be (i) if the user's recent browsing pattern is similar to the friend's recent browsing pattern, the friend's contribution is an average between a friend's interest score for the interest and the error factor, and (ii) if the user's recent browsing pattern is not similar to the friend's recent browsing pattern, the friend's contribution is (a) equal to the error factor if the friend's interest score for the interest is larger than the initial interest score for the interest, and (b) equal to negative of the error factor otherwise. Then, for each interest, the user's interest score may be calculated as a sum of the initial interest score for the interest and, for all the friends considered, the friend contribution to the user's interest score for the interest.

Method 700 may further include performing a market study based on the user's interest scores of the users and/or distributing one or more advertisements according to a strategy based on the user's interest scores of the users.

The disclosed exemplary embodiments provide a parallel computing system, a method and a computer program product for determining a number of resources to be used for a computing job to minimize energy consumption. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Figure 8:
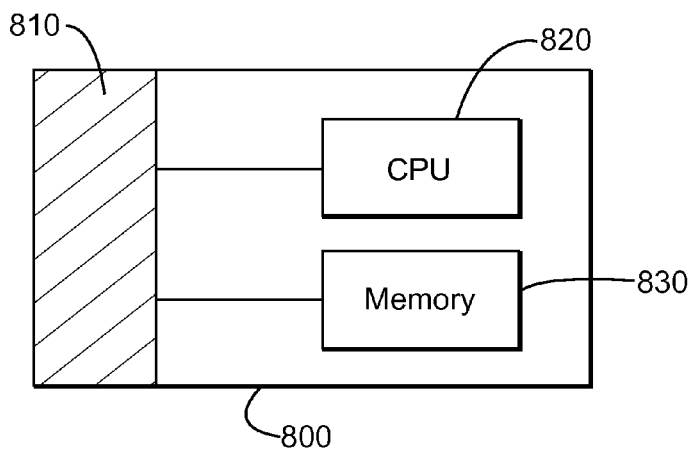
FIG. 8 is a schematic diagram of an apparatus for assessing
user interest scores as altered by friends' influence according
to an exemplary embodiment.

A schematic diagram of an apparatus 800 for assessing user interest scores as altered by friends' influence according to another exemplary embodiment is illustrated in FIG. 8. The apparatus 800 includes an interface 810 and a data processing unit 820 (CPU, i.e., hardware, such as a processor, for data processing and carrying out instructions). The interface 810 is configured to receive information related to a plurality of users using a browsing application and a social networking application. The data processing unit 820 is configured (A) to determine initial interest scores corresponding to user's interests and interest scores of friends of the user for the user's interests based on the information based on usage of the browsing application, wherein the friends of the user are among the users and are identified based on usage of the social networking application, (B) to assess user's interest scores based on the initial interest scores, the interest scores of the friends and friends' influence, and (C) to output a list including a subset of users selected based on the users' interest scores. Apparatus 800 may include a memory 830 non-transitory storing executable codes which, when executed on a data processing, unit make the apparatus perform a method for assessing user interest scores of users of a browsing application and a social networking application. The memory may also store the information received via the interface 810 and or user interest scores to enable tracking their evolution.

The data processing unit 820 may include (A) an initial scores-calculating module configured to determine initial interest scores corresponding to user's interests, (B) a social network relationship module configured to identify the friends of the user and to calculate the interest scores of friends of the user for the user's interests, and (C) a friends' influence estimation module configured to assess the user's interest scores based on the initial interest scores, the interest scores of the friends and the friends' influence.

The data processing unit 820 may further be configured to determine the user's interests based on the user's browsing history over a predetermined recent period of time. The data processing unit 820 may also be configured to determine each of the initial interest scores corresponding to one of the user's interests using a ratio of time spent on browsing content related to the corresponding one of the user's interests and a total browsing time, and optionally configured to determine the interest scores of the friends in the same manner as the initial interest scores of the user.

Optionally, the data processing unit 820 may be configured to consider a friend's influence to be positive if a user's recent browsing pattern is similar to the friend's recent browsing pattern. The data processing unit may also be configured so that if the user's recent browsing pattern is not similar to the friend's recent browsing pattern, to consider a friend's influence for a specific interest negative if the user's initial score for the specific interest is larger than the friend's initial score for the specific interest, but positive otherwise.

The data processing unit may be configured to assess the user's interest scores by (A) calculating an error factor that is equal to one over a number of the friends taken into consideration, (B) for each interest and each friend, calculating a friend's contribution to a user's interest score for the interest based on predetermined rules and (C) for each interest, calculating the user's interest score as a sum of the initial interest score for the interest and, for all the friends considered, the friend contribution to the user's interest score for the interest. The predetermined rules may include (i) if the user's recent browsing pattern is similar to the friend's recent browsing pattern, the friend's contribution is an average between a friend's interest score for the interest and the error factor, and (ii) if the user's recent browsing pattern is not similar to the friend's recent browsing pattern, the friend's contribution is (a) equal to the error factor if the friend's interest score for the interest is larger than the initial interest score for the interest, and (b) equal to negative of the error factor otherwise.

The data processing unit 820 may also be configured to perform a market study based on the user's interest scores, and/or to distribute one or more advertisements according to a strategy based on the user's interest scores.

One exemplary embodiment is a computer program product stored on a computer-readable storage medium non-transitory storing computer-readable instructions which, when executed on a computer, make the computer perform a method for assessing user interest scores of users of a browsing application and a social networking application such as method 700. Any suitable computer-readable medium may be utilized, including hard disks, CD-ROMs, digital versatile disc (DVD), optical storage devices, or magnetic storage devices such a floppy disk or magnetic tape. Other non-limiting examples of computer-readable media include flash-type memories or other known memories.

The disclosed exemplary embodiments provide methods and apparatuses for assessing user interest scores of users of a browsing application and a social networking application. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for assessing user interest scores of users of mobile network, the method comprising:
   for each of a plurality of users,
      determining initial interest scores corresponding to user's interests and interest scores of friends of the user for the user's interests, based on browsing information, and
      assessing user's interest scores based on the initial interest scores, the interest scores of the friends and friends' influence, wherein the friends' influence is inferred based at least on comparing browsing patterns of the user and the friends of the user, respectively; and
   outputting a list including a subset of the users selected based on the user's interest scores,
   wherein
   a friend's influence is positive if user's recent browsing pattern is similar to friend's recent browsing pattern,
   if the user's recent browsing pattern is not similar to the friend's recent browsing pattern, a friend's influence for a specific interest is negative if the user's initial score for the specific interest is larger than friend's initial score for the specific interest, and is positive otherwise, and
   the assessing of the user's interest scores includes:
      calculating an error factor that is equal to one divided by a number of the friends taken into consideration;
      for each interest and each friend, calculating a friend's contribution to a user's interest score for the interest as follows:
         if the user's recent browsing pattern is similar to the friend's recent browsing pattern, the friend's contribution is an average between a friend's interest score for the interest and the error factor;
         if the user's recent browsing pattern is not similar to the friend's recent browsing pattern, the friend's contribution is (A) equal to the error factor if the friend's interest score for the interest is larger than the initial interest score for the interest, and (B) equal to negative of the error factor otherwise; and
      for each interest calculating the user's interest score as a sum of the initial interest score for the interest and, for all the friends considered, the friend contribution to the user's interest score for the interest.

2. The method of claim 1, wherein the friends of the user are identified based on call data records or a call graph.

3. The method of claim 1, wherein the friends of the user are identified based on information gathered via a social network application.

4. The method of claim 1, wherein the user's interests are determined based on user's browsing history over a predetermined recent period of time.

5. The method of claim 4, wherein each of the initial interest scores and the friend's scores corresponding to one of the user's interests is calculated using a ratio of a time spent on browsing content related to the corresponding one of the user's interests and a total browsing time.

6. The method of claim 1, wherein the user's interests are structured as domains up to a first predetermined number of domains, and as sub-domains up to a second predetermined number of sub-domains for each domain.

7. The method of claim 1, further comprising:
   performing a market study based on the user's interest scores of the users.

8. The method of claim 1, further comprising:
   distributing one or more advertisements according to a strategy based on the user's interest scores of the users.

9. An apparatus for assessing user interest scores as altered by friends' influence, the apparatus comprising:
   an interface configured to receive information related a plurality of users; and
   a data processing unit including at least a processor and configured
      to determine initial interest scores corresponding to user's interests and interest scores of friends of the user for the user's interests based on browsing information;
      to assess user's interest scores based on the initial interest scores, the interest scores of the friends and friends' influence; and
      to output a list including a subset of the users selected based on the user's interest scores,
   wherein the data processing unit is configured to infer the friends' influence based at least on comparing browsing patterns of the user and the friends of the user, respectively,
   wherein the data processing unit is configured
      to consider a friend's influence to be positive if user's recent browsing pattern is similar to friend's recent browsing pattern,
      if the user's recent browsing pattern is not similar to the friend's recent browsing pattern, to consider a friend's influence for a specific interest negative if the user's initial score for the specific interest is larger than friend's initial score for the specific interest, and positive otherwise, and
      to assess the user's interest scores by:
         calculating an error factor that is equal to one over a number of the friends taken into consideration;
         for each interest and each friend, calculating a friend's contribution to a user's interest score for the interest as follows:
            if the user's recent browsing pattern is similar to the friend's recent browsing pattern, the friend's contribution is an average between a friend's interest score for the interest and the error factor;
            if the user's recent browsing pattern is not similar to the friend's recent browsing pattern, the friend's contribution is (A) equal to the error factor if the friend's interest score for the interest is larger than the initial interest score for the interest, and (B) equal to negative of the error factor otherwise; and for each interest calculating the user's interest score as a sum of the initial interest score for the interest and, for all the friends considered, the friend contribution to the user's interest score for the interest.

10. The apparatus of claim 9, wherein the data processing unit is configured to identify the friends of the user based on call data records or a call graph.

11. The apparatus of claim 9, wherein the data processing unit is configured to identify the friends of the user based on information gathered via a social network application.

12. The apparatus of claim 9, wherein the data processing unit includes
   an initial scores calculating module configured to determine initial interest scores corresponding to user's interests;
   a social network relationship module configured to identify the friends of the user and to calculate the interest scores of friends of the user for the user's interests; and
   a friend's influence estimation module configured to assess the user's interest scores based on the initial interest scores, the interest scores of the friends and the friends' influence.

13. The apparatus of claim 9, wherein the data processing unit is configured to determine the user's interests based on user's browsing history over a predetermined recent period of time.

14. The apparatus of claim 9, wherein the data processing unit is configured to determine each of the initial interest scores and the friend's scores corresponding to one of the user's interests using a ratio of a time spent on browsing content related to the corresponding one of the user's interests and a total browsing time.

15. The apparatus of claim 9, wherein the user's interests are structured as domains up to a first predetermined number of domains, and as sub-domains up to a second predetermined number of sub-domains for each domain.

16. The apparatus of claim 9, wherein data processing unit is further configured to perform a market study based on the user's interest scores.

17. The apparatus of claim 9, wherein data processing unit is further configured to distribute one or more advertisements according to a strategy based on the user's interest scores.

18. A non-transitory computer readable medium storing executable codes which when executed on a computer make the computer perform a method for assessing user interest scores of users of a mobile network, the method comprising:
   for each of a plurality of users,
      determining initial interest scores corresponding to user's interests and interest scores of friends of the user for the user's interests, based on browsing information, and
      assessing user's interest scores based on the initial interest scores, the interest scores of the friends and friends' influence, wherein the friends' influence is inferred based at least on comparing browsing patterns of the user and the friends of the user, respectively; and
   outputting a list including a subset of the users selected based on the user's interest scores,
   wherein
   a friend's influence is positive if user's recent browsing pattern is similar to friend's recent browsing pattern,
   if the user's recent browsing pattern is not similar to the friend's recent browsing pattern, a friend's influence for a specific interest is negative if the user's initial score for the specific interest is larger than friend's initial score for the specific interest, and is positive otherwise, and
   the assessing of the user's interest scores includes:
      calculating an error factor that is equal to one divided by a number of the friends taken into consideration;
      for each interest and each friend, calculating a friend's contribution to a user's interest score for the interest as follows:
         if the user's recent browsing pattern is similar to the friend's recent browsing pattern, the friend's contribution is an average between a friend's interest score for the interest and the error factor;
         if the user's recent browsing pattern is not similar to the friend's recent browsing pattern, the friend's contribution is (A) equal to the error factor if the friend's interest score for the interest is larger than the initial interest score for the interest, and (B) equal to negative of the error factor otherwise; and
      for each interest calculating the user's interest score as a sum of the initial interest score for the interest and, for all the friends considered, the friend contribution to the user's interest score for the interest.

* * * * *